United States Patent
Fildes et al.

(10) Patent No.: US 11,958,099 B2
(45) Date of Patent: Apr. 16, 2024

(54) ELECTRONIC SENSORS, METHODS, AND SYSTEMS FOR PIPE BENDERS

(71) Applicant: IDEAL Industries, Inc., Sycamore, IL (US)

(72) Inventors: Trevor Don Fildes, DeKalb, IL (US); Sushil N. Keswani, Sycamore, IL (US); Jordan Elliott Gladden, Sycamore, IL (US); Madison Rae Shoemaker, Noblesville, IN (US); Alan E. Zantout, Sycamore, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 538 days.

(21) Appl. No.: 17/098,807

(22) Filed: Nov. 16, 2020

(65) Prior Publication Data

US 2022/0126348 A1  Apr. 28, 2022

Related U.S. Application Data

(60) Provisional application No. 63/104,273, filed on Oct. 22, 2020.

(51) Int. Cl.
  *B21D 7/14* (2006.01)
  *H04Q 9/00* (2006.01)

(52) U.S. Cl.
  CPC ............... *B21D 7/14* (2013.01); *H04Q 9/00* (2013.01); *H04Q 2209/47* (2013.01); *H04Q 2213/002* (2013.01)

(58) Field of Classification Search
  CPC ... B21D 7/02; B21D 7/12; B21D 7/14; B21D 7/16
  See application file for complete search history.

(56) References Cited

U.S. PATENT DOCUMENTS

| | | | |
|---|---|---|---|
| 1,272,552 A | 7/1918 | Spencer | |
| 2,584,537 A | 2/1952 | Benfield | |
| 2,817,986 A | 12/1957 | Benfield | |
| 4,269,056 A | 5/1981 | Kozinski | |
| 4,425,784 A | 1/1984 | D'Gerolamo | |
| 4,587,832 A | 5/1986 | Illguth | |
| 4,622,837 A | 11/1986 | Bergman | |
| 5,144,823 A | 9/1992 | Wood | |
| 5,669,258 A | 9/1997 | Luebke | |
| 5,768,790 A | 6/1998 | Norman | |
| 6,209,371 B1 | 4/2001 | Guinn | |
| 6,422,054 B1 | 6/2002 | White | |
| 6,834,527 B2 | 12/2004 | Hopwood | |
| 6,980,880 B1 | 12/2005 | Ramsey | |
| 7,624,607 B2 | 12/2009 | King | |
| 7,775,899 B1 | 8/2010 | Cannon | |
| 8,307,691 B1 | 11/2012 | Bolander | |
| 9,968,976 B2 | 5/2018 | Klinger | |
| 10,569,320 B2 | 2/2020 | Nobles | |
| 2015/0033813 A1 | 2/2015 | Leclerc | |
| 2017/0095849 A1* | 4/2017 | Nobles | B21D 7/14 |

* cited by examiner

*Primary Examiner* — Teresa M Ekiert
(74) *Attorney, Agent, or Firm* — Greenberg Traurig, LLP

(57) ABSTRACT

An apparatus for determining an angle of a handle of a pipe bender includes a sensor configured to determine an orientation angle of the sensor and a display configured to display the orientation angle of the sensor. The apparatus further includes a housing configured to attach to the handle of the pipe bender. The sensor is within the housing.

29 Claims, 9 Drawing Sheets

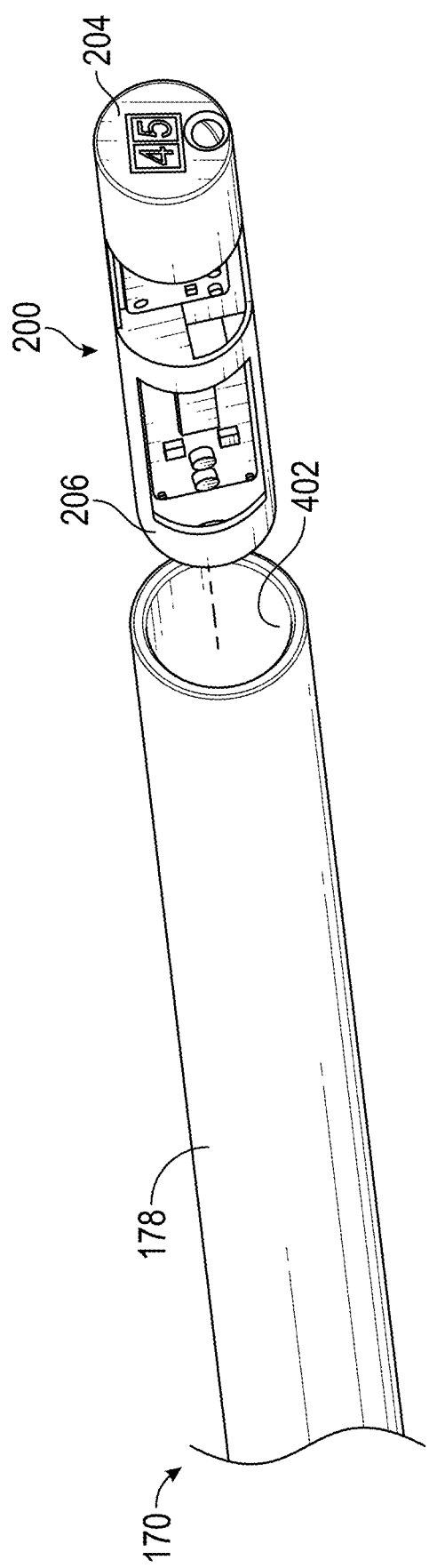
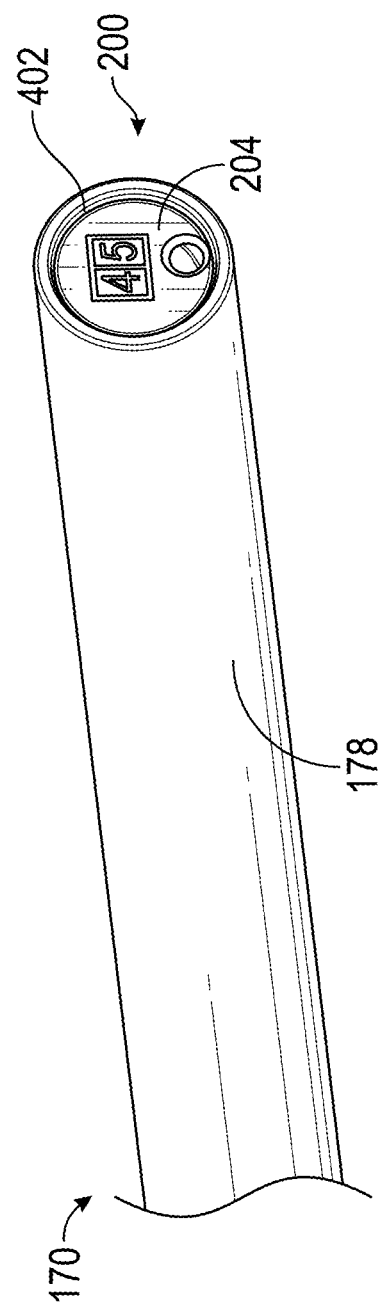
FIG. 4A
FIG. 4B

ELECTRONIC SENSORS, METHODS, AND SYSTEMS FOR PIPE BENDERS

CROSS-REFERENCE TO RELATED PATENT APPLICATION

This application claims the benefit of U.S. Provisional Patent Application No. 63/104,273, filed Oct. 22, 2020, the entire contents of which are hereby incorporated by reference in their entirety.

FIELD OF THE DISCLOSURE

The present disclosure relates generally to pipe benders and more particularly to sensors for pipe benders, such as a sensor and display for indicating an angle of a pipe bender handle.

BACKGROUND OF RELATED ART

There are numerous types and styles of portable pipe benders which may be used by electricians for bending a workpiece (e.g., pipe or conduit) at a job site to form bends or curves of predetermined angles prior to installation of the pipe or conduit in a new or existing building. The pipe conduit may be used, for example, as a duct for housing electrical wiring. One of the most common types of pipe or conduit benders used by electricians has a head that includes an arcuate-shaped base or rocker portion with a longitudinally extending pipe or conduit-receiving groove formed therein. There is a pipe or conduit-engaging hook portion formed at one end and a foot treadle portion at the opposite end. An elongated handle is attached to the head for applying bending pressure to a section of pipe or conduit in combination with pressure applied to the treadle portion. Examples of these types of benders are shown in U.S. Pat. Nos. 2,584,537; 2,817,986; and 4,269,056; the disclosures of each of which are hereby incorporated herein by reference in their entirety.

Various methods and devices may be used to assist electrician or other user of a pipe bender in achieving desired bends in a pipe. By way of example, U.S. Pat. No. 6,980,880 describes mechanisms and devices for performing pipe bends of consistent angles and for a mechanical or digital protractor that may be used to determine the actual angle of a bend in a pipe.

By way of further example, U.S. Pat. No. 5,144,823 describes an audio and/or visual indicator that indicates when a desired bend angle is achieved.

However, it is seen that the use of devices for achieving desired bends in pipes or conduits often involve calibration of those devices, steps including fixing the devices to the pipe or conduit being bent, or other aspects that take additional time and effort for the person performing the bend in the pipe or conduit.

While the referenced devices may be sufficient for their intended purposes, there remains an identifiable need to provide an improved device for assisting in achieving accurate pipe bends for various applications.

SUMMARY

Described herein are various sensors and methods for using them with a pipe bender, including a device for visually indicating an orientation angle of a handle of a pipe bender that may be removably or permanently affixed to the handle of the pipe bender itself.

A better appreciation of the objects, advantages, features, properties, and relationships of the subject tool will be obtained from the following detailed description and accompanying drawings which set forth illustrative examples which are indicative of the various ways in which the principles of the described tool may be employed.

BRIEF DESCRIPTION OF THE DRAWINGS

FIGS. 4A and 4B are perspective views illustrating inserting the first example angle indicator display device of FIG. 2 into a handle of a pipe bender in accordance with the teachings of the present disclosure.

DETAILED DESCRIPTION

Figure 1:
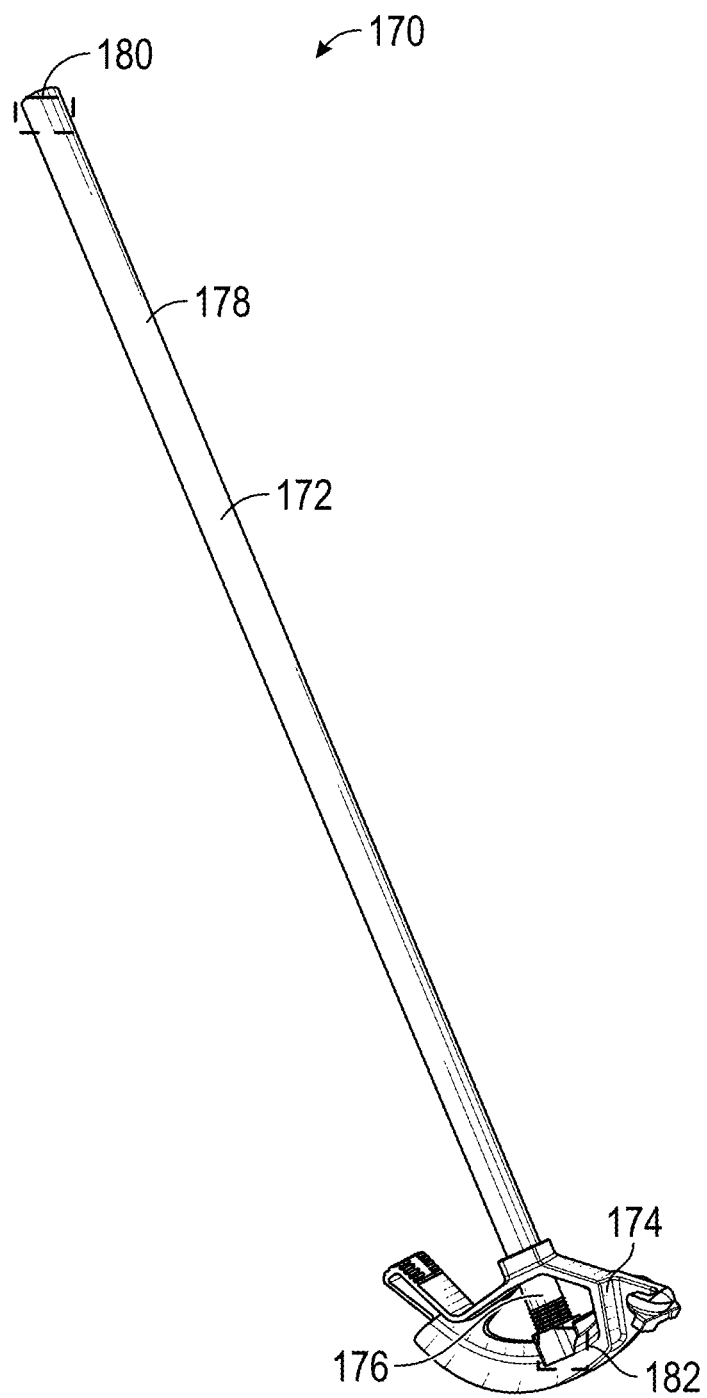
FIG. 1 is a perspective view of a pipe bender in accordance with the teachings of the present disclosure.

The following disclosure of example methods and apparatus is not intended to limit the scope of the detailed description to the precise form or forms detailed herein. Instead the following disclosure is intended to be illustrative so that others may follow its teachings.

When an electrician or other tradesman attempts to estimate a bend angle for a piece of pipe or conduit, they are typically guessing exactly where to stop the forming operation for a particular bend angle in the pipe. Disclosed herein are methods, systems, and apparatuses for improving the process of bending pipe or conduit by getting feedback on indicating what angle a user has bent the pipe to. In addition, other types of sensors, electronic devices, wireless communication chips or transmitters, etc. may be incorporated into or affixed to a pipe bender to enhance use of the pipe bender. As such, the example devices, systems, and method disclosed herein may be used for implementing a wide array of functionalities with a pipe bender. Furthermore, a platform for managing such devices may be provided as a software application stored as instructions executable by a processor on non-transitory computer readable media.

The software application instructions may be stored on a memory on an electronic device on the pipe bender and/or may be stored on a different computing device. Wireless communications between a device on the pipe bender and the computing device may be achieved using a wireless radio, wireless transmitter, wireless transceiver, radio frequency identification (RFID) chips, or any other hardware for wireless communication. In various embodiments, a device on the pipe bender may also be connectable to a computing device via a wired connection. In this way, any measurements, sensor outputs, calculations by processors, etc. that occur at the pipe bender may be transmitted to a different computing device. Similarly, communications from the computing device may be sent to a device on the pipe bender.

Communications from a computing device to a pipe bender device may be communications for calibrating sensors on the pipe bender, desired settings (e.g., a desired orientation angle for a pipe bend, when or what type of feedback should be output to a user by the device on the pipe bender) for the device on the pipe bender, etc.

In various embodiments, there may be one or more electronic device or sensor on a pipe bender. For example, one or more of a temperature sensor, RFID chip, global positioning system (GPS) chip, accelerometer, gyroscope, or any other type of sensor or device may be on or in the pipe bender. Such sensors may communicate with a separate computing device through a wired or wireless connection as disclosed herein. Furthermore, such sensors may communicate with one another through a wired or wireless connection. In this way, an entire system may be implemented that senses multiple points or types of data on a pipe bender, those sensors may communicate with one another to determine aspects of the pipe bender or its surrounds that are only determinable using the output from multiple sensors, and data may be transmitted to yet another computing device that is not part of the pipe bender. Such a computing device, such as a smart phone or tablet, may merely receive data from the sensors on the pipe bender, or may use the data from sensors to perform additional calculations or inferences based on the data. In some embodiments, calculations or inferences based on the data may be performed by one or more processors on or in the pipe bender that are in communication with the sensors.

In addition to sensors or devices on the pipe bender, additional sensors, devices, or portions of devices may also be affixed to a pipe being bent. For example, a first sensor may be placed on a pipe and a second sensor may be located on a bender. Those two sensors may communicate with one another or with a third device (e.g., a processor or other computing device) so that, for example, a bend angle may be calculated using the two sensors. The third device may be on the pipe, on the bender, or not attached to either of the pipe or the bender (e.g., a computing device with which the sensors communicate wirelessly). In various embodiments, the third device may also be part of or otherwise joined to or connected one of the two sensors that is attachable to the pipe or the bender itself.

Temperature sensors may be used to indicate conditions of an environment for pipe bending, which may be useful in indicating how certain bends should be performed. A geographic locator chip (e.g., GPS chip) may be used to locate a tool (e.g., if the tool has gone missing). For example, a user may look on their computing device (e.g., smartphone or tablet) to check a software application that may communicate with a server that can locate the tool based on communications with the geographic locator chip such as GPS. An RFID chip may also be in or on the pipe bender. Such a chip may be used to inventory tools, locate tools in a truck, etc. Such inventory could also be taken whenever the pipe bender is used, so that a user can track what tools are used for a particular job or used at particular times or days for a particular job. Various embodiments described herein may use accelerometers and/or gyroscopes to determine an orientation angle of a pipe bender so that more accurate bends may be made while using a pipe bender.

A visual angle display indicator device may, for example, be placed or located on a top of a handle of a handheld pipe bender. The top of the handle is an advantageous location for an angle display indicator, because that portion of the pipe bender is more visible to the user than other portions of the pipe bender when making a bend. Such an indicator may display, in real time, an orientation angle of the handle of the pipe bender while the pipe bender is in use, such that the user will better know what angle they may have bent a pipe to. This enhances the precision and control a user may have while using a handheld pipe bender. Advantageously, the examples of angle display indicators disclosed herein include a display that is perpendicular or normal to an axis of the pipe bender handle. Such examples may be more visible to a user while using the pipe bender than, for example, a display attached to the side of a pipe bender handle.

Because the angle indicator display devices disclosed herein may be aligned with a handle of a pipe bender, the sensor of the angle indicator display device may advantageously be calibrated specifically to the bender. For example, handheld pipe benders as described herein are typically used to bend a pipe that is placed on a level floor. Thus, the sensor may be configured for measuring an angle between a level floor and the handle of the pipe bender. In this way, the angle indicator display devices may not need to be calibrated (e.g., be adjusted to set a zero or baseline for the angle measurement) because the angle indicator display device aligns with the handle of a pipe bender that has a typical expected use orientation. Thus, a user may make more accurate bends without having to know how to properly calibrate an angle measurement device.

The examples disclosed herein also provide for secure attachment of the angle display indicator to the pipe bender. If an angle display indicator is not securely affixed to a pipe bender and/or is not properly aligned with the orientation of the pipe bender handle, an angle display indicator may provide inaccurate measurements. The angle display indicators and pipe benders described herein provide for secure attachment and alignment with the pipe bender so that accurate orientation angle measurements may be displayed to the user, further enhancing the accuracy of bends made by the user. For example, as disclosed further herein, the angle indicator display devices described herein may be inserted into an end of the handle of a pipe bender or have an opening that receives an end of the handle of a pipe bender. Such a configuration provides for secure attachment of the angle indicator display devices to the handle while also ensuring that the angle indicator display device is aligned with the handle itself (e.g., an axis of the handle aligns with an axis of the angle indicator display).

The angle indicator display devices disclosed herein may also advantageously be battery powered, which provides for the devices to be wirelessly powered and easily transportable along with the pipe bender. In addition, the angle indicator display devices may be removable or permanently affixed to a pipe bender. Removable angle indicator display devices may therefore be used with more than one pipe bender, and may be removed to change the battery, for example. All circuitry and sensors for the angle indicator display may be packaged in a housing that is attachable to the handle of the pipe bender as described herein. The sensor(s) of the angle indicator display may include one or more of an, accelerometer, potentiometer, strain gauge, and/or gyroscope. Measurement of the sensor(s) may also be output to other computing devices, such as through a wired or wireless connection. Such information may be collected, stored, and/or used to control devices such as an automated or hydraulic pipe bender.

FIG. 1 is a perspective view of a pipe bender 170. The pipe bender 170 is a handheld pipe bender that may be used to bend smaller diameter pipe (e.g., ¼ inch to 1 and ½ inch pipe). While several examples are described herein with respect to pipe benders similar to that shown in FIG. 1, the angle indicator display devices may be used with other pipe benders, such as an automated and/or hydraulic pipe bender. In addition, the angle indicator display devices described herein may be affixed to any type of item for which measuring an angle with respect to the a level floor may be useful.

The pipe bender 170 includes a handle 172 and a bender head 174 that includes an arcuate-shaped rocker. The bender head 174 is attached to a first end 176 of the handle 172 and is used to interface with a pipe being bent. The handle 172 further has a second end 178, which may be referred to herein as a free end of the handle 172. The second end 178, or free end, of the handle 172 may have an angle indicator display affixed thereto as disclosed herein (whether removably or permanently affixed). A user may orient the pipe bender 170 during use with the bender head 174 contacting the ground, while the handle 172 extends away from the ground and is moved to bend a pipe.

FIG. 1 also shows two example locations 180 and 182 where sensors or other electronic devices may be placed on the pipe bender 170. For example, the location 180 may be at the second end 178 of the handle 172 and the location 182 may be on the bender head 174 of the pipe bender 170. The locations 180 and 182 as shown in FIG. 1 demonstrate just two example locations of where sensors or other devices, processors, wireless communication devices, etc. may be located on the pipe bender 170. Additional or different locations on the pipe bender 170 may also have various electronic components. In addition, the pipe bender 170 is just one type of pipe bender, and other types of pipe benders may also have various electronic components placed on different locations of such pipe benders. In various embodiments, sensors may also be placed on the pipe itself as described herein.

Figure 2:
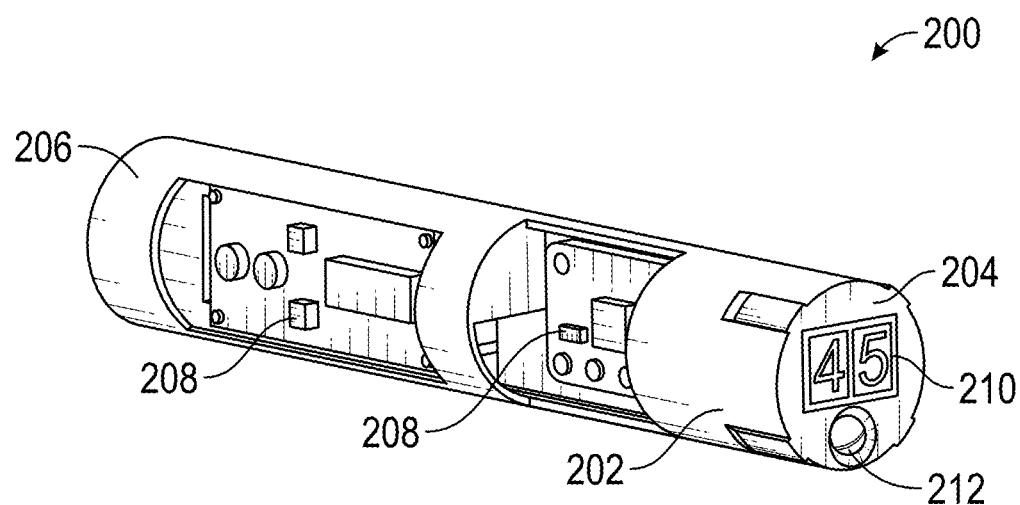
FIG. 2 is a perspective view of a first example angle indicator display device for a pipe bender in accordance with the teachings of the present disclosure.

FIG. 2 is a perspective view of a first example angle indicator display device 200 for a pipe bender. The angle indicator display device 200 includes a housing 202 that has a first end 204 and a second end 206. The housing 202 houses sensors, circuitry, electronic components, etc. for the angle indicator display device 200, as shown on the printed circuit boards (PCBs) 208. Such components may include, for example, the components shown in and discussed with respect to FIGS. 7, 8, and/or 10. The second end 206 may be configured for inserting the angle indicator display device 200 into a hollow end of a handle of a pipe bender (e.g., the free end or second end 178 of the pipe bender 170 in FIG. 1).

The first end 204 of the angle indicator display device 200 includes an angle display 210 and a light 212. The light 212 may be, for example, a light emitting diode (LED). The display may display the current orientation angle of measured by the angle indicator display device 200. The angle display 210 of FIG. 2 is configured to display a number of anywhere from zero to ninety-nine indicative of the degrees of an orientation angle of a handle of a pipe bender. However, in various examples, the angle display may include an additional digit (e.g., so the angle display includes three digits total) so that angles of greater ninety-nine degrees may be displayed. In some examples, the sensor of the angle indicator display device 200 may only be configured to measure and display angles including zero to ninety degrees, such that a third digit is not necessary. The angle display 210 is also visible on the first end 204 of the angle indicator display device 200 when it is inserted into a handle of a pipe bender as described herein.

The light 212 may also be visible on the first end 204 of the angle indicator display device 200. The light 212 may change in different was (e.g., turn on/off, change color, blink, etc.) to indicate different things. For example, the light 212 may change to indicate that the angle indicator display device 200 has been turned on or off, has a low battery, is transmitting data to another computing device wirelessly, etc. In addition, as disclosed herein, the angle indicator display device 200 may be configured to provide feedback to a user once a particular angle is reached when bending a pipe or if a user leaves a plane along which a bend should be made while bending a pipe. In such examples, the light 212 may also change once that particular angle is reached or if a user leaves the plane along which the bend should be made.

As disclosed herein, the angle indicator display device 200 is configured such that after insertion into a hollow end of a handle of a pipe bender, the first end 204 is still visible to a user. In addition, the angle indicator display device 200 may be removably attachable to the handle of the pipe bender. In other words, the angle indicator display device 200 may be taken back out of a hollow end of the handle after it has been inserted. In this way, it may be used with different pipe benders, be removed to change a battery, may be used to retrofit older pipe benders, etc.

Figure 3:
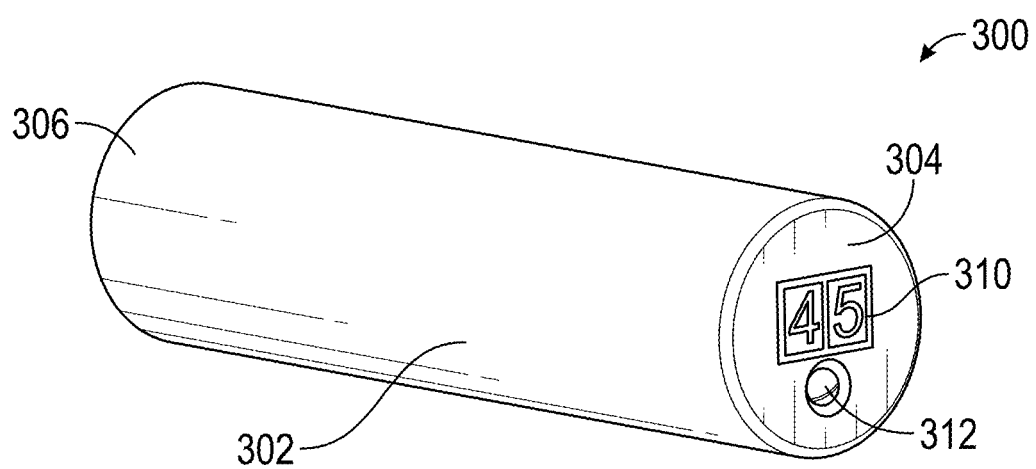
FIG. 3 is a perspective view of a second example angle indicator display device for a pipe bender in accordance with the teachings of the present disclosure.

FIG. 3 is a perspective view of a second example angle indicator display device 300 for a pipe bender. The angle indicator display device 300 has a housing 302 with a first end 304 and a second end 306. Like the angle indicator display device 200 of FIG. 2, the angle indicator display device 300 of FIG. may include various sensors and other electronic components within its housing 302. The angle indicator display device 300 may be configured with a hollow end (not pictured) at the second end 306 of the angle indicator display device 300 to fit over a free end of a handle of a pipe bender. The first end 304, like the first end 204 of the angle indicator display device 200, may include an angle display 310 and a light 312. The angle display 310 and the light 312 may be the same as or may function similar to the angle display 210 and the light 212 of FIG. 2 as disclosed herein. In addition, the first end 304 of the angle indicator display device 300 is easily visible to a user of a pipe bender when the angle indicator display device 300 is placed on the free end of the handle. In addition, like the angle indicator display device 200 of FIG. 2, the angle indicator display device 300 may also be removably attached to the handle of a pipe bender.

Both of the angle indicator display devices 200 and 300 may be affixed to a handle of a pipe bender using an interference fit, adhesive, or any other manner for removably or permanently affixing the angle indicator display devices 200 and 300 to a pipe bender handle.

FIGS. 4A and 4B are perspective views illustrating inserting the first example angle indicator display device 200 of FIG. 2 into a handle 108 of a pipe bender 170. In particular, FIG. 4A shows an exploded perspective view of the angle indicator display device 200 outside of an opening 402 in the second end 178 of the handle 172. FIG. 4B shows the angle indicator display device 200 inserted into the opening 402. In the example of FIG. 4B, the angle indicator display device 200 is fully inserted within the handle 172, although other configurations may be possible as disclosed herein (e.g., as shown in and described with respect to FIG. 6C). As demonstrated in FIG. 4B, the first end 204 of the angle indicator display device 200 is still visible to a user of the pipe bender.

As further demonstrated in FIGS. 4A and 4B, the handle 172 of the pipe bender is tubular, and has a hollow second end 178 to accommodate insertion of the angle indicator display device 200. The housing 202 is correspondingly cylindrical in shape so that the housing 202 is configured to fit within the hollow end of the handle 172 of the pipe bender 170. In other an outer diameter of the housing 202 of the angle indicator display device 200 is smaller than an inner diameter of the second end 178 of the handle 172 so that the angle indicator display device 200 can fit within the handle 172.

The angle indicator display devices 200 and 300 and/or the pipe bender handle 178 may also have features for installing the angle indicator display devices 200 and 300 at a particular orientation with respect to the pipe bender 170, and more particularly the bender head 174. By installing the angle indicator display devices 200 and 300 at a particular orientation with respect to the bender head 174, the user may not have to calibrate the angle indicator display devices 200 and 300. In other words, the angle indicator display devices 200 and 300 may be pre-calibrated to work as long as they are installed at a particular orientation with respect to the handle 172 and the bender head 174. For example, the sensor for measuring the orientation angle of the pipe bender 170 may be a two-axis or three-axis accelerometer. The accelerometer may be placed within the housing to have one of the axes of the accelerometer aligned along (e.g., parallel to) a direction of bending associated with a pipe bender (e.g., an axis of the arcuate-shaped bender head).

Various features may be used to assist a user in installing the angle indicator display devices 200 and 300 according to a desired orientation. For example, angle indicator display devices 200 and 300 may include one or more markings (e.g., an arrow, a line) configured to align with one or more markings on the handle 172 so that the angle indicator display devices 200 and 300 are installed at a desired orientation. In another example, mechanical features (e.g., tongue and groove) that interact with one another may be formed on the handle 172 and the angle indicator display devices 200 and 300 so that the angle indicator display devices 200 and 300 can only be properly placed on the handle 172 in a desired orientation. In this way, the angle indicator display devices 200 and 300 may be more user friendly, as less calibration of the devices may be required by a user to use the angle indicator display devices 200 and 300.

Figure 5A:
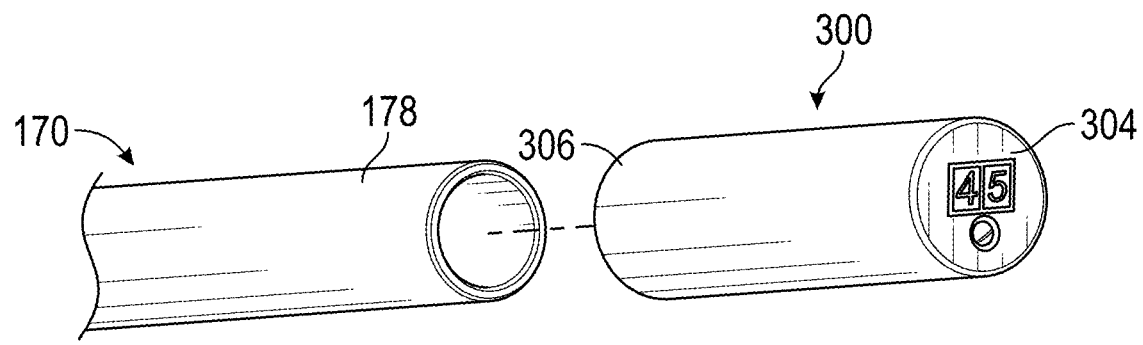
FIGS. 5A and 5B are perspective views illustrating inserting a handle of a pipe bender into the second example angle indicator display device of FIG. 3 in accordance with the teachings of the present disclosure.
Figure 5B:
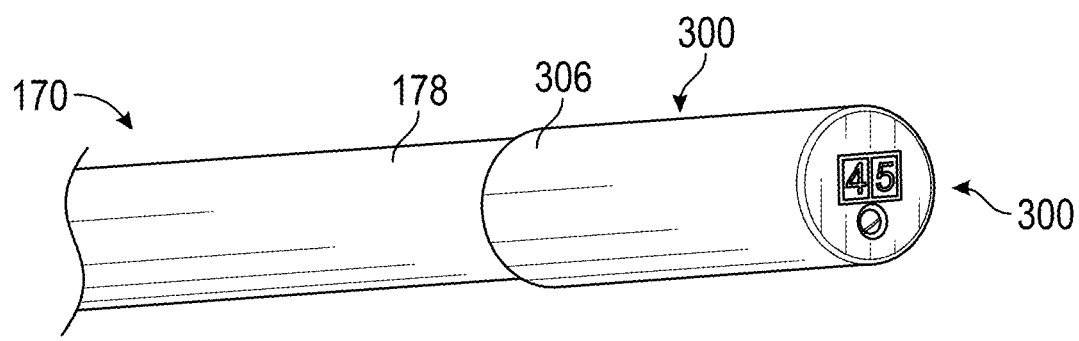

FIGS. 5A and 5B are perspective views illustrating inserting a handle 172 of a pipe bender 170 into the second example angle indicator display device 300 of FIG. 3. The angle indicator display device 300 has a tubular hollow end sized to accommodate the second end 178 of the pipe bender 170 handle 172. In other words, an outer diameter of the second end 178 of the handle 172 is smaller than an inner diameter of the hollow end of the angle indicator display device 300 so that the handle 172 may fit inside the angle indicator display device 300.

Figure 6A:
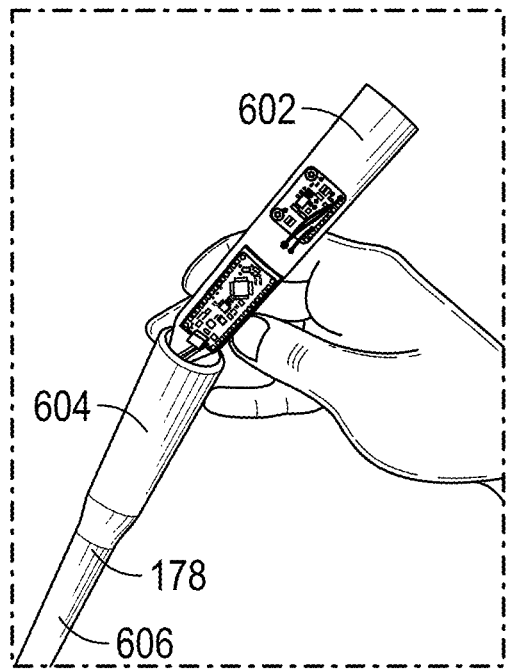
FIGS. 6A-6C are perspective views illustrating inserting a third example angle indicator display device into a handle of a pipe bender in accordance with the teachings of the present disclosure.
Figure 6B:
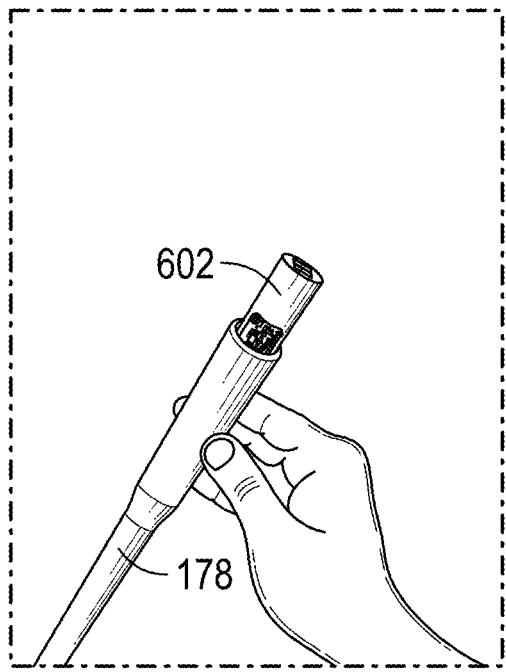
Figure 6C:
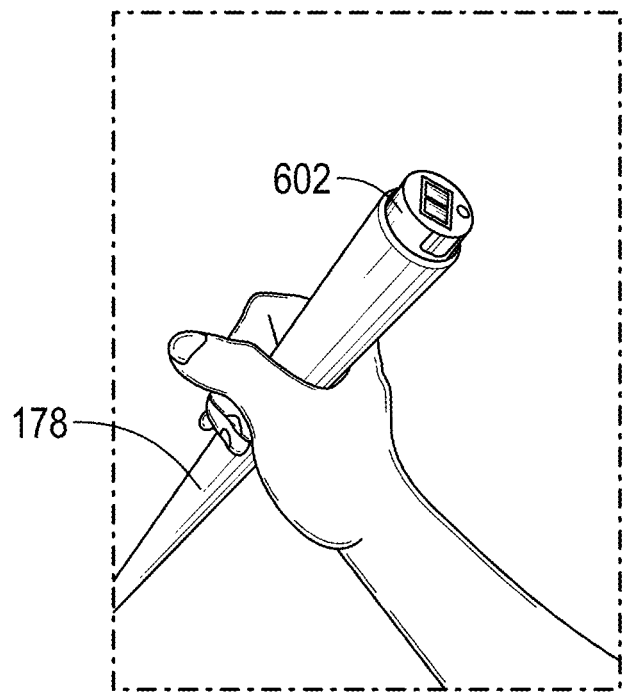

FIGS. 6A-6C are perspective views illustrating inserting a third example angle indicator display device 602 into a handle of a pipe bender. As shown in FIG. 6A the second end 178 of the pipe bender handle 172 may be wider at a section 604 of the handle 172 than it is at a section 606 of the 172 closer to a terminal end of the second end 178 of the handle 172. In this way, a housing of the angle indicator display device 602 may be sized to fit within the section 604 of the handle 172 but not within the section 606 of the handle 172. Such a configuration may aid in an interference fit between the angle indicator display device 602 and the handle 172, because a transition portion between the sections 604 and 606 may assist in creating the interference fit. In addition, in various examples, the housing of the angle indicator display device 602 may also be specially configured at its second end for an interference fit with the section 606 or the transition portion between the sections 604 and 606. FIG. 6A shows the angle indicator display device 602 almost completely removed from the handle of the pipe bender 172, FIG. 6B shows the angle indicator display device 602 partially inserted into the handle of the pipe bender 172, and FIG. 6C shows the angle indicator display device 602 fully inserted into the handle of the pipe bender 172.

In addition, as shown in FIG. 6C, the angle indicator display device 602 is configured to partially extend from the handle in contrast to the angle indicator display device 200 in FIG. 4B. Such a configuration may be advantageous where, for example, the angle indicator display device 602 is removable from the pipe bender. The portion of the angle indicator display device 602 that extends from the pipe bender handle 172 may advantageously be easy for the user to grasp when removal of the angle indicator display device 602 is desired.

Figure 7:
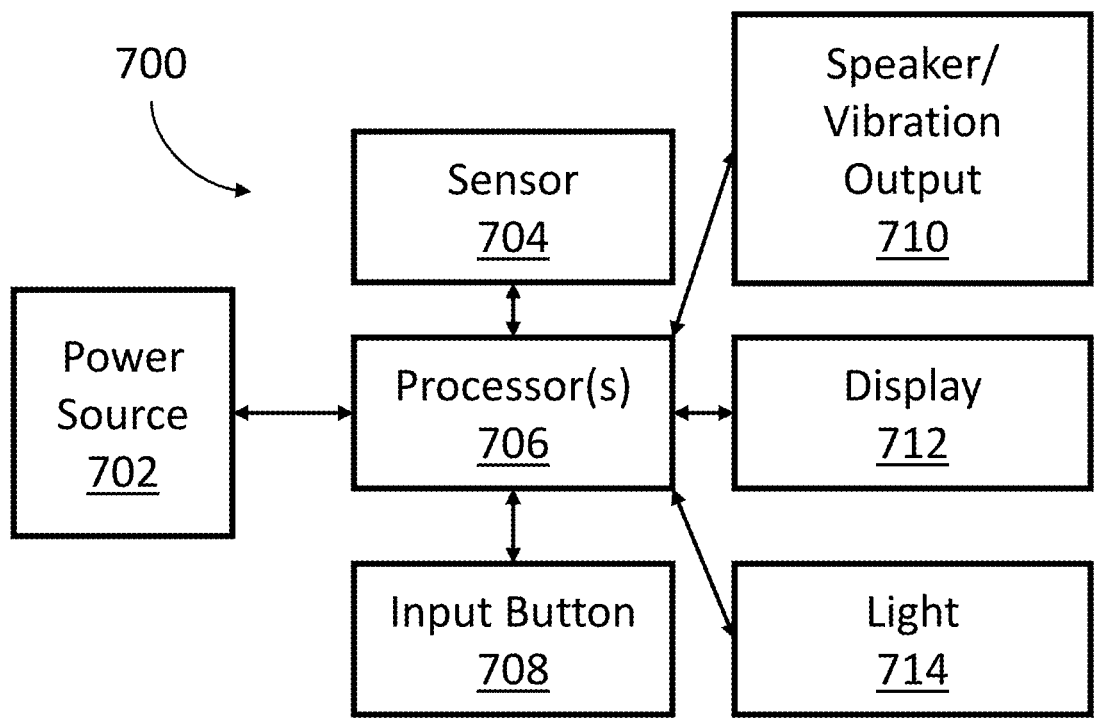
FIG. 7 is a block diagram view of an example system for an example angle indicator display device in accordance with the teachings of the present disclosure.

FIG. 7 is a block diagram view of an example system 700 for an example angle indicator display device. The various aspects of the system 700 may be inside and/or on a housing of an angle indicator display device as disclosed herein. Such an angle indicator display device may therefore be a self-contained unit which may be installed inside, on, and/or around a handle of a pipe bender as described herein to determine and display an orientation angle of the pipe bender. The installation can be permanent or removable depending on style and battery life, replacement, etc. as disclosed herein. One or more sensors 704 may be used to determine/measure position information including orientation angle of the handle, and that information may be processed by one or processors 706 and sent as an output or feedback to the user.

In particular, the processor 706 and/or other devices of the system 700 may be powered by a power source 702, such as a battery. However, in other examples other power sources may be used. The processor 706 may be operatively coupled to the sensor 704, an input button 708, a speaker/vibration output 710, a display 712, and a light 714. Although not shown in FIG. 7, the system 700 may also include memory on which code (e.g., non-transient computer readable instructions) is stored and read or executed by the processor 706. Such code may cause the processor 706 to perform any of the actions, steps, methods, etc. disclosed herein.

For example, the processor 706 may receive orientation angle data from the sensor 704, determine the orientation angle from the orientation angle data, and output a signal to cause that orientation angle to be displayed on the display 712. The display 712 may be the same as or similar to the displays 210 and 310 described with respect to FIGS. 2 and 3.

The processor 706 may also control outputs to a speaker/vibration output 710, the display 712, and/or the light 714 to indicate other things such as low battery, that the device is powered on/off, that the device is being powered on/off, that an input from the input button 708 has been received, etc.

The input button 708 may be used to turn on/off the system 700. In various examples, the input button 708 may also be used to set a desired angle to bend a pipe to. In various examples, the input button 708 may be used for multiple purposes. For example, the input button may 708 may cause the processor 706 to perform different functions based on how long the input button 708 is pressed. For example, a press longer than a predetermined threshold of time may cause the system 700 to turn on/off, while a press shorter than the predetermined threshold may used to set a desired angle to bend a pipe to.

A user may set an angle desired to bend a pipe to by holding the handle at a desired angle, checking that the display 712 displays the desired angle, and pressing the input button 708. An example method for setting a desired angle is discussed further below with respect to FIG. 9. After the desired angle is set, the processor 706 may be configured to send a feedback output whenever the orientation angle as measured using the sensor 704 returns to that desired angle. Another example method for sending feedback to a user when the bender handle leaves a plane in which the pipe bend should be made is discussed further below with respect to FIG. 10.

Feedback devices may include the display 712, the light 714, the speaker/vibration output 710, or any other type of output/feedback device. For example, the light 714 may flash, turn on, or change color when the desired angle is reached or when the bender handle leaves a desired bending plane. The speaker/vibration output 710 may produce an audible sound or may produce a haptic feedback or vibration that a user of a pipe bender could feel.

The sensor 704 may be an accelerometer or any other type of device that may measure an angle of a handle of a pipe bender. For example, a long strain gauge may be attached to a bottom of a bender head instead of a handle of the bender. As the pipe or conduit is bending, the pipe or conduit will apply more pressure to the bender head and resistance from the long strain gauge may be used to determine an angle at which the has been conduit bent. Accordingly, in some examples, the sensor 704 may not be in an end of the handle of a bender. In another example, the sensor 704 and/or other components of the system 700 may be located on the pipe or conduit itself or anywhere else on the bender where the type of sensor 704 would allow angle measurements at a given placement.

In another example, a potentiometer may be the sensor 704 used to measure angle of the pipe bent. For example, a long resistor may be placed on a bender head of a pipe bender, where it touches the pipe or conduit. As the pipe or conduit makes electrical contact, resistance increases because an effective resistor length also increases. The resulting voltage is measured across the resistor may be used to determine the length of the resistor, which may in turn be used to determine an angle of the bend.

Figure 8:
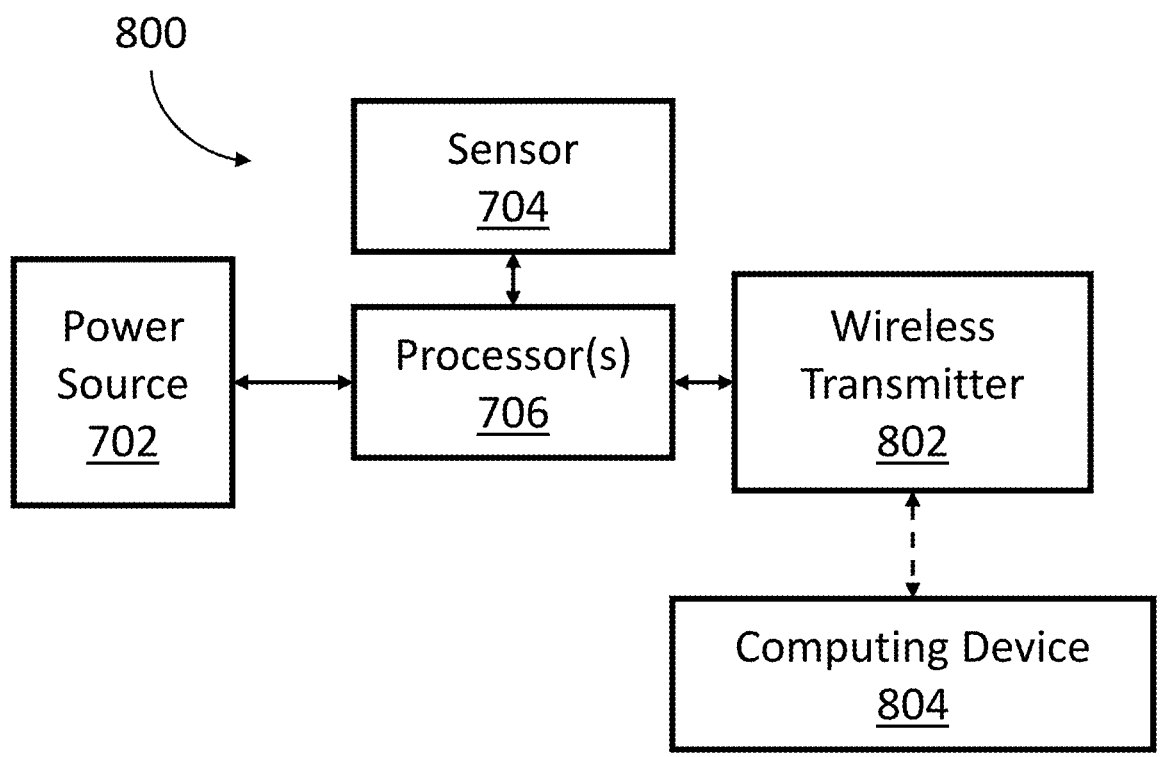
FIG. 8 is a block diagram view of a second example system for an example angle indicator display device in accordance with the teachings of the present disclosure.

FIG. 8 is a block diagram view of a second example system 800 for an example angle indicator display device. The system 800 includes the power source 702, the sensor 704, and the processor 706. The processor 706 is further operatively connected to a wireless transmitter 802. The wireless transmitter 802 may, in various examples, be a wireless transceiver capable of both transmitting and receiving signals and data.

The wireless transmitter 802 may communicate with a computing device 804. The computing device 804 may be communicated with through a wired or wireless (e.g., Bluetooth) connection. The computing device 804 may be any type of computing device, controller, processor, etc. For example, the computing device 804 may be smartphone, tablet, laptop, larger output display, specially built computing device for use with the system 800, a controller of a hydraulic or otherwise automated pipe bender, etc. In this way, the system 800 may be configured to communicate with any other type of computing device.

Data representative of the sensor 704 measurements may be send to the computing device 804 via the wireless transmitter 802 for display, collection, or any other purpose. In various examples, the wireless transmitter 802 may also be a transceiver that may receive signals/data from the computing device 804. For example, a user may indicate on an interface of the computing device 804 a desired angle for bending a pipe to. That input may be received by the processor 706 and used for outputting feedback to the user when that desired angle is reached/returned to. The feedback output may be to the computing device 804, or may be to another component not pictured in FIG. 8 (e.g., a speaker/vibration output, a display in the housing of the system 800, a light, etc.).

In some examples, an automatic angle measurement system as described herein (e.g., the systems 700 or 800) may be used with a hydraulic or other powered pipe bender. The pipe bender may have a controller that acts as the computing device 804. In this way, the pipe bender may receive information from the processor 706 about an orientation angle as measured by the sensor 704, so that the movement of the pipe bender may be controlled to bend a pipe to a desired angle in an automated fashion.

In various embodiments, additional, different, or fewer aspects than those shown in FIGS. 7 and 8 may be used. For example, multiple sensors of the same or different types may be used on a single pipe bender and/or attached to a pipe that is being bent, such as temperature sensors, accelerometers, gyroscopes, etc. Other devices such as wireless radios, GPS chips, RFID chips, or any other type of electronic devices may be additionally used. In addition, as disclosed herein, various electronic components (whether shown in FIGS. 7 and 8 or not) may communicate with one another through wired or wireless connections, and may each communicate with a separate computing device (e.g., the computing device 804) through wired or wireless connections in various embodiments.

Figure 9:
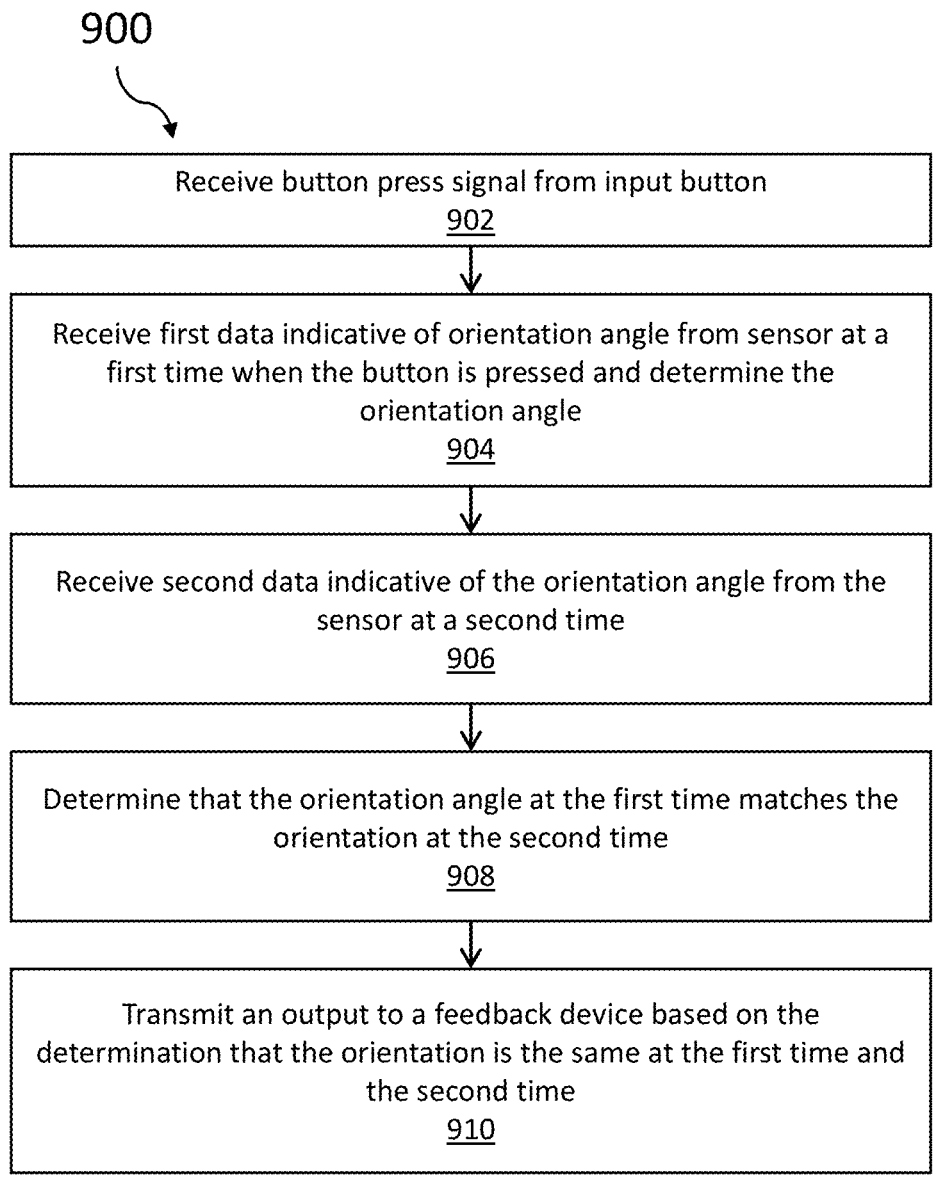
FIG. 9 is a flow chart illustrating an example method for setting a desired orientation angle using an angle indicator display device in accordance with the teachings of the present disclosure.

FIG. 9 is a flow chart illustrating an example method 900 for setting a desired orientation angle using an angle indicator display device. At an operation 902, a button press signal from an input button (e.g., the input button 708 of FIG. 7) is received. At an operation 904, first data indicative of an orientation angle as measured by a sensor (e.g., the sensor 704 of FIG. 7) is received at the time when the input button was pressed. In this way, the desired orientation angle may be determined.

At an operation 906, second data indicative of the orientation angle from the sensor is received at a second time (e.g., at a time after the first time and after the desired angle has been determined). In an operation 908, the processor (e.g., the processor 706 of FIG. 7), determines that the orientation angle at the first time (e.g., the desired angle) matches the orientation at the second time. In other words, the system waits until the angle matches the desired angle. At an operation 910, based on the angle matching the desired angle, an output is transmitted to a feedback device (e.g., a light, a speaker/vibration output device, a display, a separate computing device) to alert the user that the desired output angle has been reached.

Figure 10:
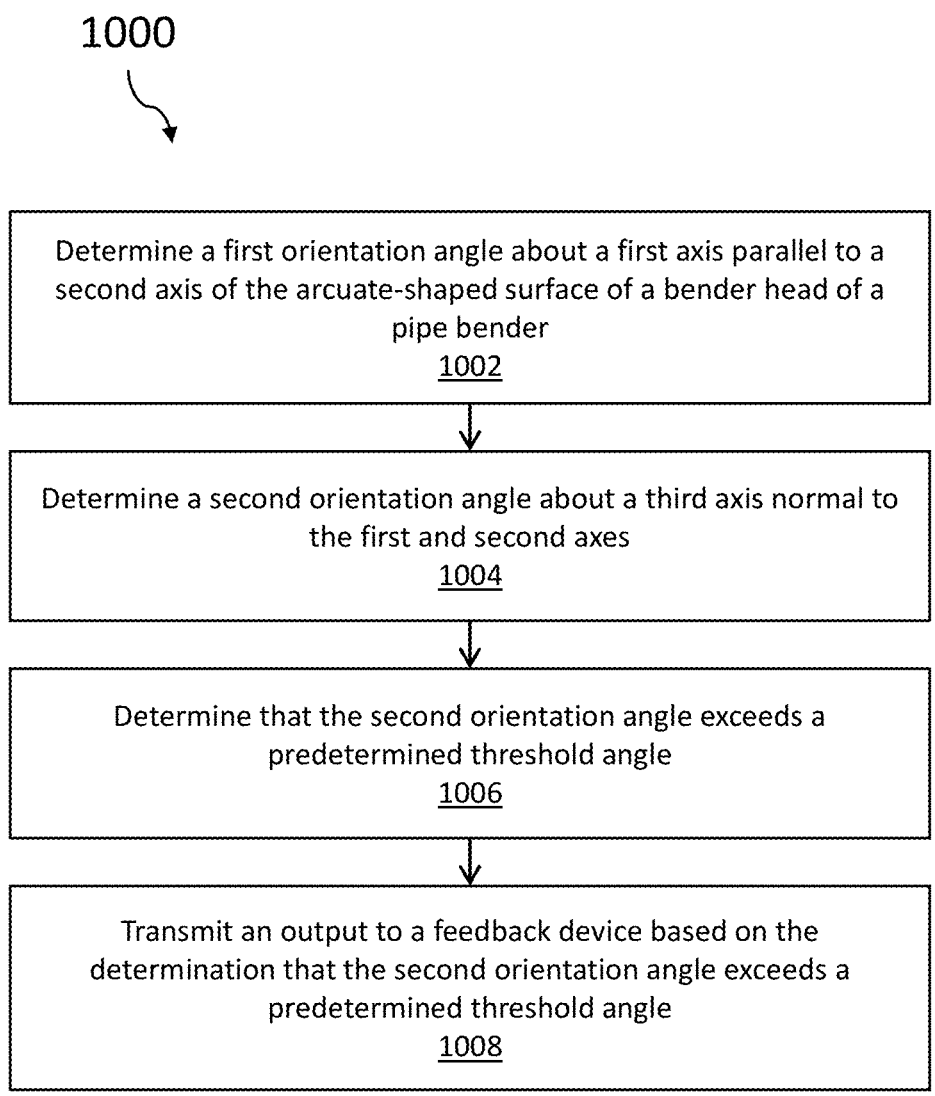
FIG. 10 is a flow chart illustrating an example method for providing feedback to a user of a pipe bender when an orientation of the pipe bender moves out of a plane of an intended bend in accordance with the teachings of the present disclosure.

FIG. 10 is a flow chart illustrating an example method 1000 for providing feedback to a user of a pipe bender when an orientation of the pipe bender moves out of a plane of an intended bend. In the method 1000, a sensor such as an accelerometer may be used to determine if a user is bending a pipe outside of a desired plane and send feedback if the user is doing so. An accelerometer such as a two or three axis accelerometer may be used, for example. An angle outside of a desired plane for bending a pipe may also be described herein as a dogleg angle. As disclosed herein, it may aid use to orient one of such axes of an accelerometer with an axis of an arcuate-shaped surface of a bender head. In this way, the output of one axis of the accelerometer may be used to measure the desired bend angle and a second axis normal to the first axis may be used to measure whether the user is bending a pipe outside of a desired plane. However, in various embodiments, one of the axes may not have to be aligned with an axis of the bender head, as calculations and proper calibration may still be made based on an accelerometer in any orientation to determine an orientation angle associated with a desired bend and an orientation angle associated with undesired bend.

As described above with respect to FIGS. 4A, 4B, 5A, and 5C, a pipe bender handle and angle indicator display devices may be configured to ensure that the accelerometer in the angle indicator display device is oriented with the pipe bender as desired (e.g., having an axis of an accelerometer parallel to an axis of an arcuate-shaped surface of a bender head used to bend pipes). Such features may be markings, mechanical features that interact, interfere, etc. with one another to achieve a desired orientation between the angle indicator display device and the pipe bender. Such features may be used to assist in orienting a device for which the method 1000 is used.

At an operation 1002, a first orientation angle indicating a first degree of rotation about a first axis parallel to a second axis of an arcuate-shaped surface of a bender head of the pipe bender is determined. In other words, the device determines a bend angle along a desired bend direction (e.g., within a desired plane) as disclosed herein. Such an angle may be output to a display or otherwise used to assist a user in making accurate bends. The first axis is parallel to an axis of the arcuate-shaped surface of the bender head that actually bends the pipe. In this way, the first orientation angle measured represents a bend angle of the pipe. In various embodiments, the operation 1002 may be omitted if it is desired to only alert a user when they leave the desired plane and the bend angle is not measured. In such embodiments, it is possible that only a single axis accelerometer may be used to measure the angle of the handle outside of the desired bend plane.

In an operation 1004, a second orientation angle indicating a second degree of rotation about a third axis normal to the first axis and the second axis is determined. The third axis may additionally be parallel to a level ground or aligned with the force of gravity. Rotation about the third axis represents motion that is not desired when bending a pipe because it pulls part of the pipe outside of a desired bend plane. Thus, the second orientation angle may be determined and monitored to determine when or if a user has moved the handle of a pipe bender outside of a desired tolerance or threshold of zero degrees rotation about the third axis normal to the first and second axes.

In an operation 1006, the second orientation angle is determined to exceed such a predetermined threshold angle when a user moves the handle outside of the desired bend plane. The predetermined threshold angle may be, for example, anywhere from zero to ten degrees, such as zero degrees, one degree, two degrees, three degrees, four degrees, five degrees, six degrees, seven degrees, eight degrees, nine degrees, or ten degrees.

In an operation 1008, based on the determination that the second orientation angle exceeds the predetermined threshold angle, an output signal is transmitted to a feedback device. As described herein, the feedback device may be a haptic feedback device, visual feedback device, auditory feedback device, or any other type of feedback device. In this way, the user may be alerted that they are moving the handle of the pipe bender outside of a desired bend plane for the pipe being bent.

Another example device for measuring angle of a pipe bender may include two sensors. For example, a first sensor may be placed at one of the sensor locations 180 and 182 described above and shown in FIG. 1. A second sensor may be attached to a pipe being bent, and in particular may attach to the portion of the pipe that will move while being bent with the pipe bender (while another portion of the pipe will stay relatively stationary while the pipe is being bent). The combined readings of those sensors may be used to determine how much a pipe is bent around one or more axes. For example, the sensors may be an accelerometer/gyroscope tilt sensor such as an MPU-6050 chip. Such sensors may provide raw values of an amount gravitational acceleration in three different axes, and when connected to a processor, may be used to calculate an angle of tilt of how the pipe is being bent in multiple directions using trigonometry in software code within the processor or within memory connected to the processor. The sensors' three axes about which they measure gravitational acceleration may or may not align with the angle of tilt measured along multiple axes using the sensors. Notwithstanding, the outputs of the sensors may be used to determine first and second angles of tilt about first and second axes, respectively (whether such first and second axes align with the axes of measurement of the sensors or not).

For example, the first angle of tilt about the first axis may be about a first axis parallel to the axis of the arcuate-shaped surface of a bender head. That first angle of tilt may represent a primary bend angle of the pipe being bent (e.g., the angle being bent within a plane desired by the user to bend the pipe). In other words, the first axis may represent an angle about which the bender head is intended to rock/rotate to impart a bend on a pipe.

A second angle of tilt measured by a second of the one or more accelerometers/gyroscope tilt sensors may be about a second axis normal to the first axis. A third axis normal to both the first and second axes may generally be normal to a level ground or the force of gravity. The angles of tilt may be calculated based on the measurements taken by the two accelerometers/gyroscope tilt sensors (whether or not the axes of the sensors align with the first and second axes about which the desired first and second angles of tilt are determined).

Therefore, at least two different angles of tile may be calculated. A desired bend angle for the pipe may correspond with the first angle of tilt measured. The second angle of tilt may represent a dogleg angle or angle a bender handle is outside a desired bend plane. Each of the first and second angles of tilt may be separately displayed on a display or other output device.

The two sensors in different locations may therefore be used so that an effective or desired bend angle is calculated based on a difference between measurements from each sensor about. Such embodiments may also include a button in connection with the processor and sensor circuit that, when pressed, sets an angle reading calculated based on the angle of tilt measured by each sensor about its respective second axis to zero. This allows for any offset when initially placing the sensors on the conduit. Accordingly, methods using more than one sensor may increase the accuracy of measurements taken and versatility of a pipe bender. In this way, any unlevel surfaces and/or air bends performed using the pipe bender may be accounted for (e.g., if the pipe bender is not being used on a level surface).

Figure 11:
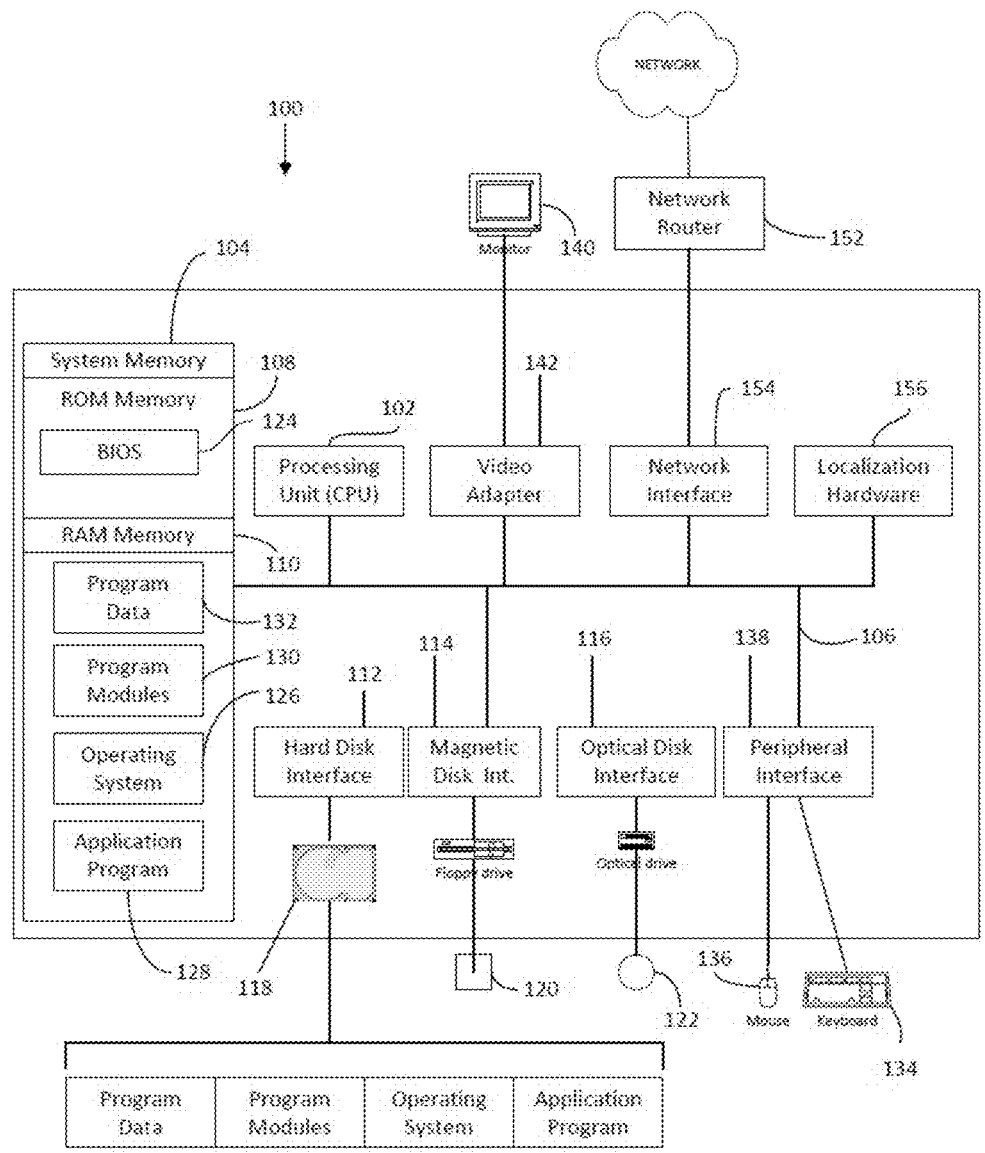
FIG. 11 is a diagrammatic view of an example of a user computing environment in accordance with the teachings of the present disclosure.

FIG. 11 is a diagrammatic view of an example of a user computing environment that includes a general-purpose computing system environment 100, such as a desktop computer, laptop, smartphone, tablet, or any other such device having the ability to execute instructions, such as those stored within a non-transient, computer-readable medium. Various computing devices as disclosed herein (e.g., the angle indicator display devices, the computing devices) may be similar to the computing system 100 or may include some components of the computing system 100. Furthermore, while described and illustrated in the context of a single computing system 100, those skilled in the art will also appreciate that the various tasks described hereinafter may be practiced in a distributed environment having multiple computing systems 100 linked via a local or wide-area network in which the executable instructions may be associated with and/or executed by one or more of multiple computing systems 100.

In its most basic configuration, computing system environment 100 typically includes at least one processing unit 102 and at least one memory 104, which may be linked via a bus 106. Depending on the exact configuration and type of computing system environment, memory 104 may be volatile (such as RAM 110), non-volatile (such as ROM 108, flash memory, etc.) or some combination of the two. Computing system environment 100 may have additional features and/or functionality. For example, computing system environment 100 may also include additional storage (removable and/or non-removable) including, but not limited to, magnetic or optical disks, tape drives and/or flash drives. Such additional memory devices may be made accessible to the computing system environment 100 by means of, for example, a hard disk drive interface 112, a magnetic disk drive interface 114, and/or an optical disk drive interface 116. As will be understood, these devices, which would be linked to the system bus 306, respectively, allow for reading from and writing to a hard disk 118, reading from or writing to a removable magnetic disk 120, and/or for reading from or writing to a removable optical disk 122, such as a CD/DVD ROM or other optical media. The drive interfaces and their associated computer-readable media allow for the nonvolatile storage of computer readable instructions, data structures, program modules and other data for the computing system environment 100. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 100.

A number of program modules may be stored in one or more of the memory/media devices. For example, a basic input/output system (BIOS) 124, containing the basic routines that help to transfer information between elements within the computing system environment 100, such as during start-up, may be stored in ROM 108. Similarly, RAM 110, hard drive 118, and/or peripheral memory devices may be used to store computer executable instructions comprising an operating system 126, one or more applications programs 128 (which may include the functionality disclosed herein, for example), other program modules 130, and/or program data 122. Still further, computer-executable instructions may be downloaded to the computing environment 100 as needed, for example, via a network connection.

An end-user may enter commands and information into the computing system environment 100 through input devices such as a keyboard 134 and/or a pointing device 136. While not illustrated, other input devices may include a microphone, a joystick, a game pad, a scanner, etc. These and other input devices would typically be connected to the processing unit 102 by means of a peripheral interface 138 which, in turn, would be coupled to bus 106. Input devices may be directly or indirectly connected to processor 102 via interfaces such as, for example, a parallel port, game port, firewire, or a universal serial bus (USB). To view information from the computing system environment 100, a monitor 140 or other type of display device may also be connected to bus 106 via an interface, such as via video adapter 132. In addition to the monitor 140, the computing system environment 100 may also include other peripheral output devices, not shown, such as speakers and printers.

The computing system environment 100 may also utilize logical connections to one or more computing system environments. Communications between the computing system environment 100 and the remote computing system environment may be exchanged via a further processing device, such a network router 152, that is responsible for network routing. Communications with the network router 152 may be performed via a network interface component 154. Thus, within such a networked environment, e.g., the Internet, World Wide Web, LAN, or other like type of wired or wireless network, it will be appreciated that program modules depicted relative to the computing system environment 100, or portions thereof, may be stored in the memory storage device(s) of the computing system environment 100.

The computing system environment 100 may also include localization hardware 186 for determining a location of the computing system environment 100. In some instances, the localization hardware 156 may include, for example only, a GPS antenna, an RFID chip or reader, a WiFi antenna, or other computing hardware that may be used to capture or transmit signals that may be used to determine the location of the computing system environment 100.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A pipe bender comprising:
   a bender head comprising an arcuate-shaped rocker;
   a handle having first and second ends, the first end attached to the bender head and the second end being a free end;
   at least one sensor configured to determine an orientation angle of the at least one sensor in or on the pipe bender; and
   a display configured to display the orientation angle of the at least one sensor, wherein the display is located at or near the second end of the handle.

2. The pipe bender of claim 1, wherein the at least one sensor is located in or on the handle of the pipe bender.

3. The pipe bender of claim 1, wherein the display is configured to display a number of anywhere from zero to ninety-nine indicative of a number of degrees of the orientation angle.

4. The pipe bender of claim 1, further comprising an input component configured to receive an input indicative of a desired angle for bending a pipe.

5. The pipe bender of claim 1, wherein the at least one sensor comprises a first sensor on or in the handle of the pipe bender and a second sensor attachable to a pipe being bent using the pipe bender.

6. The pipe bender of claim 1, further comprising a housing configured to attach to the handle of the pipe bender, wherein the at least one sensor is within the housing.

7. The pipe bender of claim 6, wherein the housing is removably attachable to the handle of the pipe bender.

8. The pipe bender of claim 6, wherein the display is configured to visually indicate the orientation angle.

9. The pipe bender of claim 6, wherein the handle of the pipe bender is tubular, and further wherein the housing is cylindrical in shape and configured to fit within a hollow end of the handle of the pipe bender.

10. The pipe bender of claim 6, wherein the handle of the pipe bender is tubular, and further wherein the housing comprises an open tubular end having an opening that is greater in diameter than the handle of the pipe bender such that the open tubular end of the housing fits around an end of the handle of the pipe bender.

11. The pipe bender of claim 6, further comprising a power source within the housing.

12. The pipe bender of claim 6, comprising a processor within the housing that is operatively coupled to the at least one sensor, wherein the processor receives first data indicative of the orientation angle from the at least one sensor and transmits second data indicative of the orientation angle to the display that is configured to visually indicate the orientation angle.

13. The pipe bender of claim 6, comprising a processor within the housing that is operatively coupled to the at least one sensor, and further comprising an input button operatively coupled to the processor, wherein the processor is configured to:
   receive a button press signal from the input button;
   receive first data indicative of the orientation angle of the at least one sensor at a first time at which the button press signal is received; and
   determine the orientation angle of the at least one sensor at the first time based on the first data.

14. The pipe bender of claim 13, wherein the processor is further configured to:
   receive second data indicative of the orientation angle of the at least one sensor at a second time;
   determine the orientation angle of the at least one sensor at the second time based on the second data; and
   determine that the orientation angle of the at least one sensor at the second time matches the orientation angle of the at least one sensor at the first time.

15. The pipe bender of claim 14, wherein the processor is further configured to, based on the determination that the orientation angle of the at least one sensor at the second time matches the orientation angle of the at least one sensor at the first time, transmit an output signal to a feedback device.

16. The pipe bender of claim 15, wherein the feedback device comprises at least one of a vibration mechanism, a light, a speaker, the display, or a separate computing device configured to receive a wireless transmission.

17. The pipe bender of claim 6, wherein:
the at least one sensor is an accelerometer configured to measure rotation about at least two axes;
the orientation angle is a first orientation angle indicating a first degree of rotation about a first axis parallel to a second axis of an arcuate-shaped surface of the bender head of the pipe bender;
the at least one sensor is further configured to determine a second orientation angle indicating a second degree of rotation about a third axis normal to the first axis and the second axis; and
the pipe bender further comprises a processor within the housing that is operatively coupled to the at least one sensor, wherein the processor:
receives first data indicative of the second orientation angle from the at least one sensor;
determines that the second orientation angle exceeds a predetermined threshold angle; and
based on the determination that the second orientation angle exceeds the predetermined threshold angle, transmits an output signal to a feedback device.

18. The pipe bender of claim 6, wherein the at least one sensor is oriented within the housing to measure the orientation angle relative to gravity.

19. The pipe bender of claim 6, further comprising a wireless transmitter in the housing configured to wirelessly transmit data representative of the orientation angle to a computing device.

20. The pipe bender of claim 6, wherein the at least one sensor comprises at least one of an accelerometer, a temperature sensor, a global positioning system (GPS), or a radio frequency identification (RFID) device.

21. An apparatus comprising:
a pipe bender comprising:
a bender head comprising an arcuate-shaped rocker; and
a handle having first and second ends, the first end attached to the bender head;
a first sensor attached to the handle of the pipe bender;
a second sensor attachable to a pipe; and
a processor configured to determine an angle to which the pipe is bent based on a first output from the first sensor and a second output from the second sensor.

22. The apparatus of claim 21, wherein the first sensor and the second sensor are configured to communicate with the processor on or in the pipe bender through a wired or wireless connection.

23. The apparatus of claim 21, wherein the first sensor, the second sensor, or both, are configured to communicate with a separate computing device via a wireless transmitter on or in the pipe bender.

24. The apparatus of claim 21, wherein the processor is configured to measure a first angle of tilt about a first axis and a second angle of tilt about a second axis normal to the first axis based on outputs from the first sensor and the second sensor.

25. The apparatus of claim 24, wherein the first angle of tilt is output to a display as a bend angle, and further wherein the second angle of tilt is output to the display as a dogleg angle.

26. The apparatus of claim 21, further comprising:
an electronic device on or in the pipe bender, wherein the electronic device is configured to communicate information wirelessly to a computing device.

27. The apparatus of claim 26, wherein the electronic device further comprises at least one of a wireless transmitter, an accelerometer, a temperature sensor, a global positioning system (GPS), or a radio frequency identification (RFID) device.

28. The apparatus of claim 26, wherein the information is first information, and further wherein the electronic device is further configured to receive second information wirelessly from the computing device.

29. A pipe bender comprising:
a bender head comprising an arcuate-shaped rocker;
a handle having first and second ends, the first end attached to the bender head and the second end being a free end, wherein the handle of the pipe bender is tubular;
at least one sensor configured to determine an orientation angle of the at least one sensor in or on the pipe bender;
a display configured to display the orientation angle of the at least one sensor;
a housing configured to attach to the handle of the pipe bender, wherein the at least one sensor is within the housing, and further wherein the housing is cylindrical in shape and configured to fit within a hollow end of the handle of the pipe bender.

* * * * *